United States Patent [19]

Covington

[11] Patent Number: 5,077,960

[45] Date of Patent: Jan. 7, 1992

[54] LATCHING MECHANISM FOR A HARVESTING UNIT OF A COTTON HARVESTER

[75] Inventor: Michael J. Covington, LaGrange, Ill.

[73] Assignee: J. I. Case Company, Racine, Wis.

[21] Appl. No.: 546,423

[22] Filed: Jun. 29, 1990

[51] Int. Cl.$^5$ .............................................. A01D 46/14
[52] U.S. Cl. ................................................ 56/28; 56/40
[58] Field of Search ................... 56/13.5, 15.5, 28, 40, 56/41, 44; 172/649, 667, 673; 111/69

[56] References Cited

U.S. PATENT DOCUMENTS

| | | | |
|---|---|---|---|
| 4,249,365 | 2/1981 | Hubbard et al. | 56/13.2 |
| 4,418,517 | 12/1983 | Ehrhart et al. | 56/228 |
| 4,418,518 | 12/1983 | Koch et al. | 56/15.5 X |
| 4,803,830 | 2/1989 | Junge et al. | 56/28 |
| 4,896,492 | 1/1990 | Junge et al. | 56/28 |
| 4,922,695 | 5/1990 | Covington et al. | 56/40 |
| 5,010,718 | 4/1991 | Covington et al. | 56/28 X |

FOREIGN PATENT DOCUMENTS 231942  3/1969  U.S.S.R. .................................. 56/40

Primary Examiner—William P. Neuder
Attorney, Agent, or Firm—Dressler, Goldsmith, Shore, Sutker & Milnamow, Ltd.

[57] ABSTRACT

A latching mechanism for a laterally movable harvesting unit of a cotton harvester. The latching mechanism includes a latching pin which is associated with the harvesting unit for movement therewith and which is resiliently biased in two opposite directions. The latching pin is endwise movable along a generally straight line path between a locked position whereat the pin inhibits lateral movement of the harvesting unit and a released position whereat the pin allows lateral movement of the harvesting unit. A handle, which is selectively movable between locked and released positions, is connected to and moves the latching pin between corresponding positions. The resiliency of the latching pin allows movement of the handle between positions while facilitating consequent movement of the latching pin between corresponding positions.

9 Claims, 6 Drawing Sheets

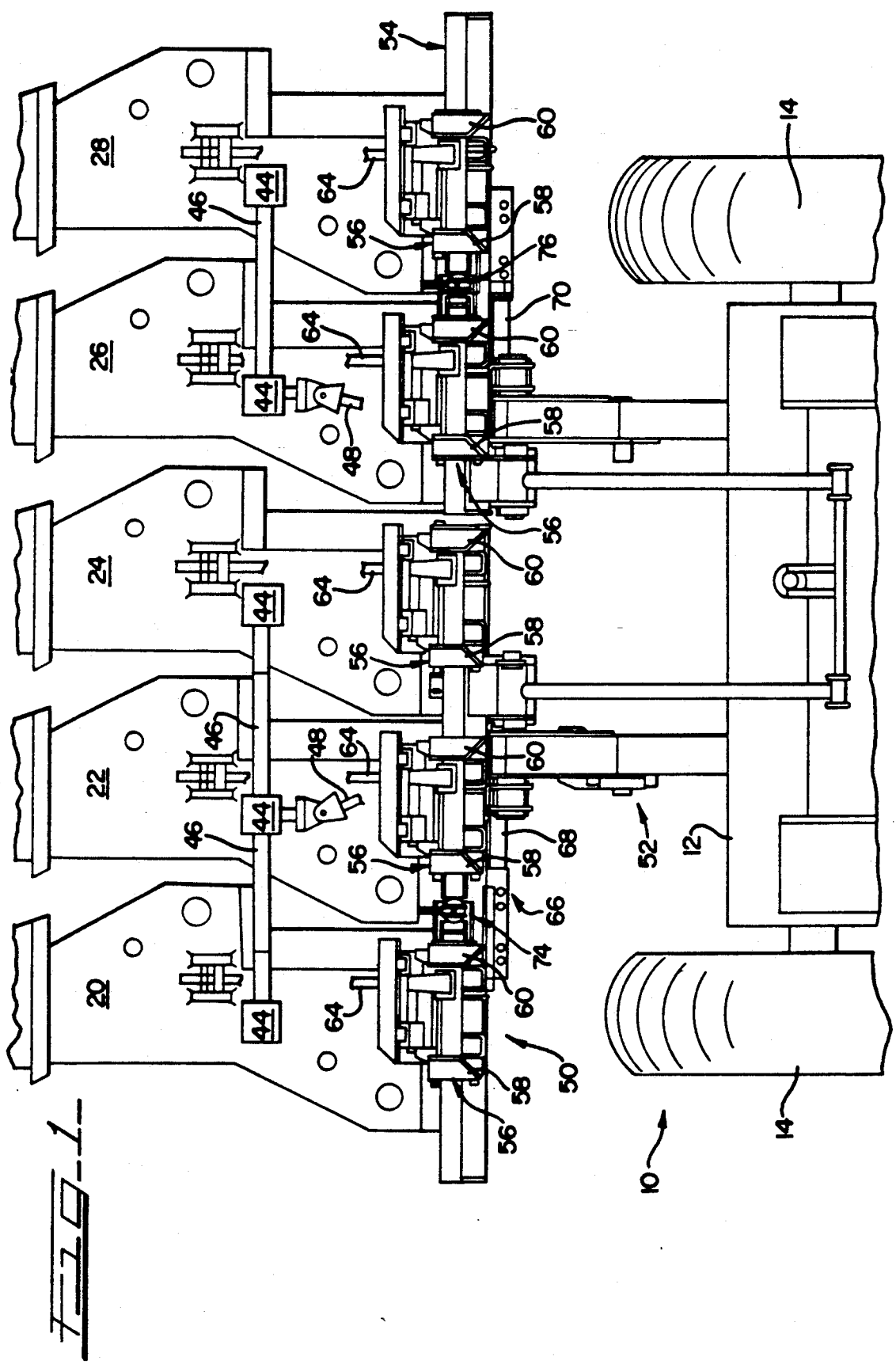

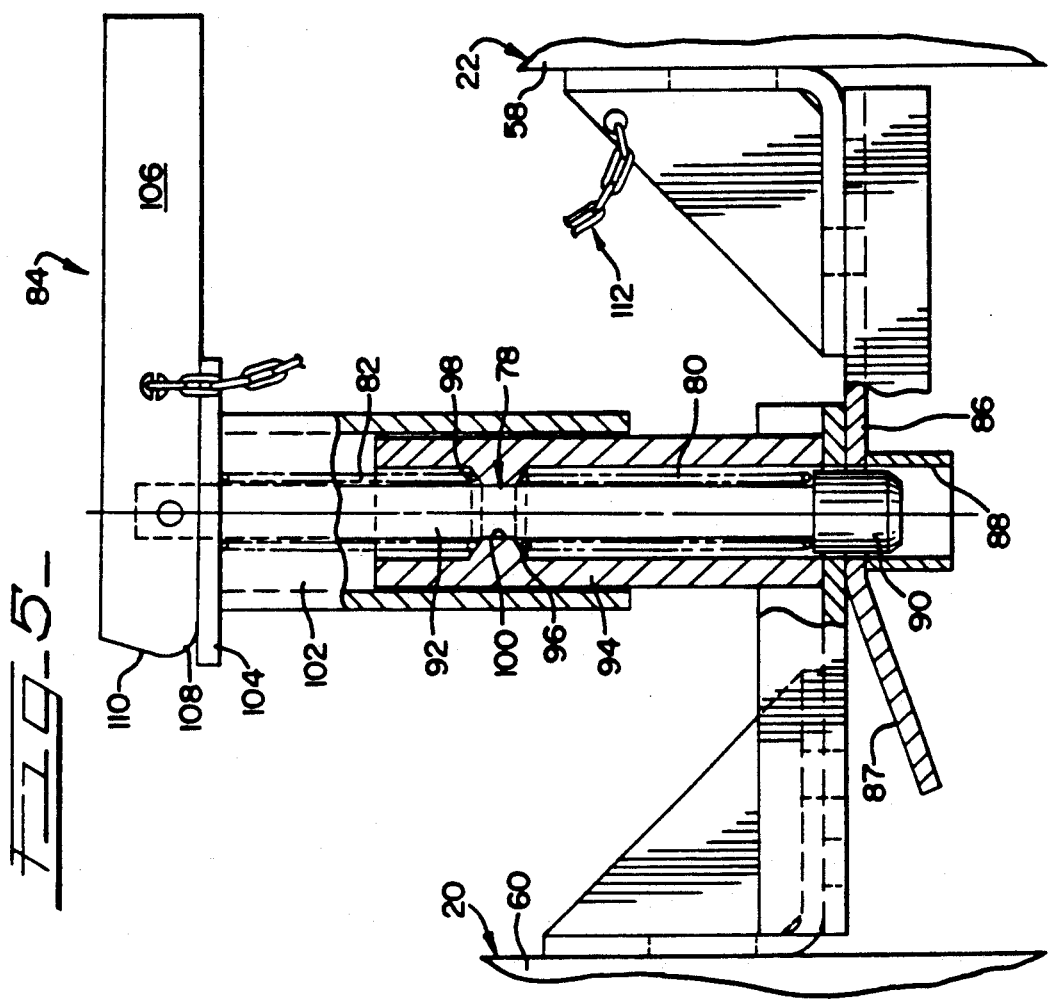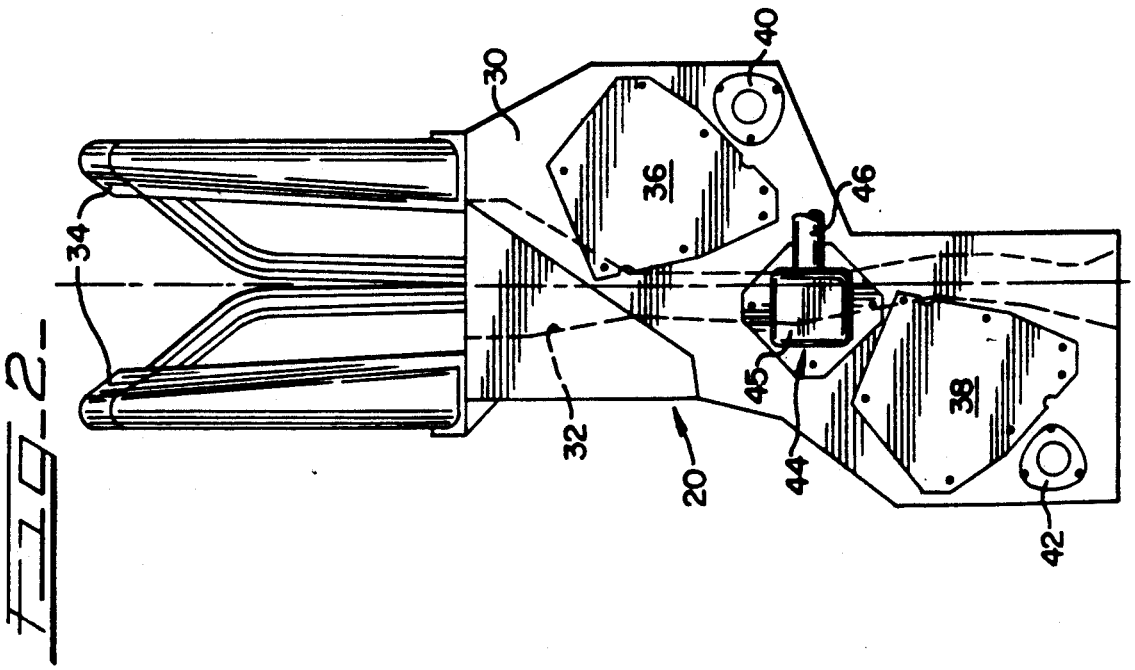

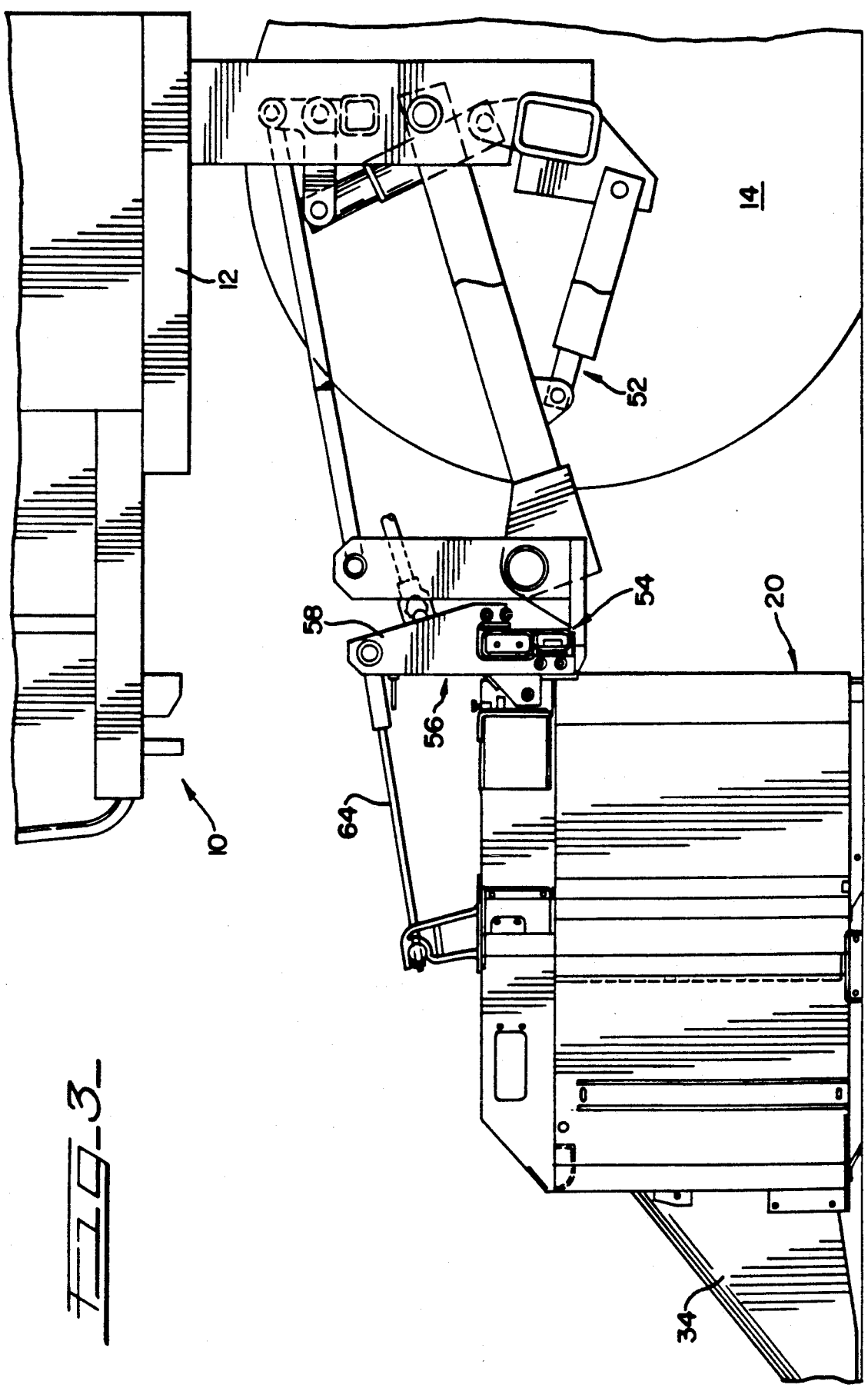

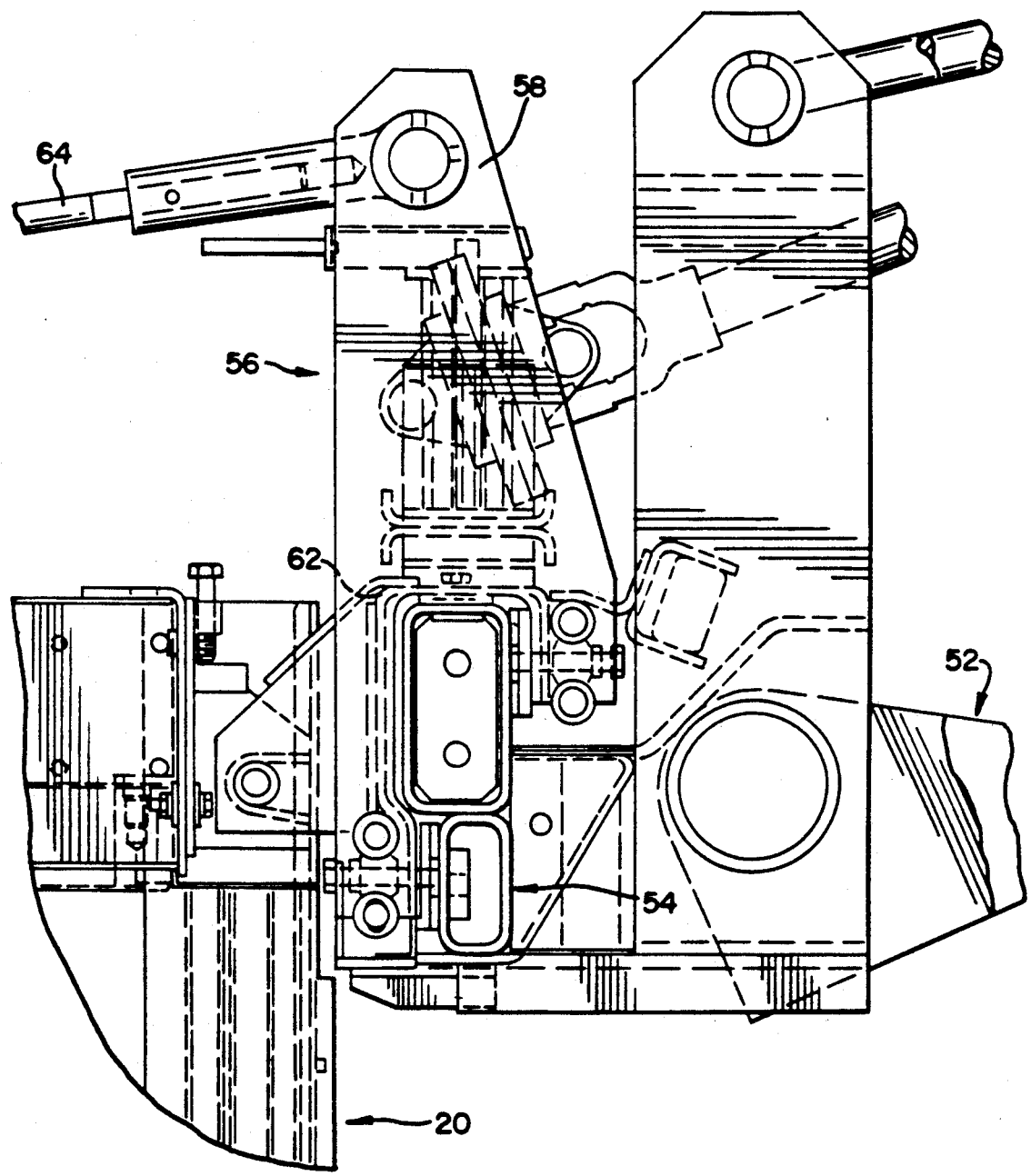

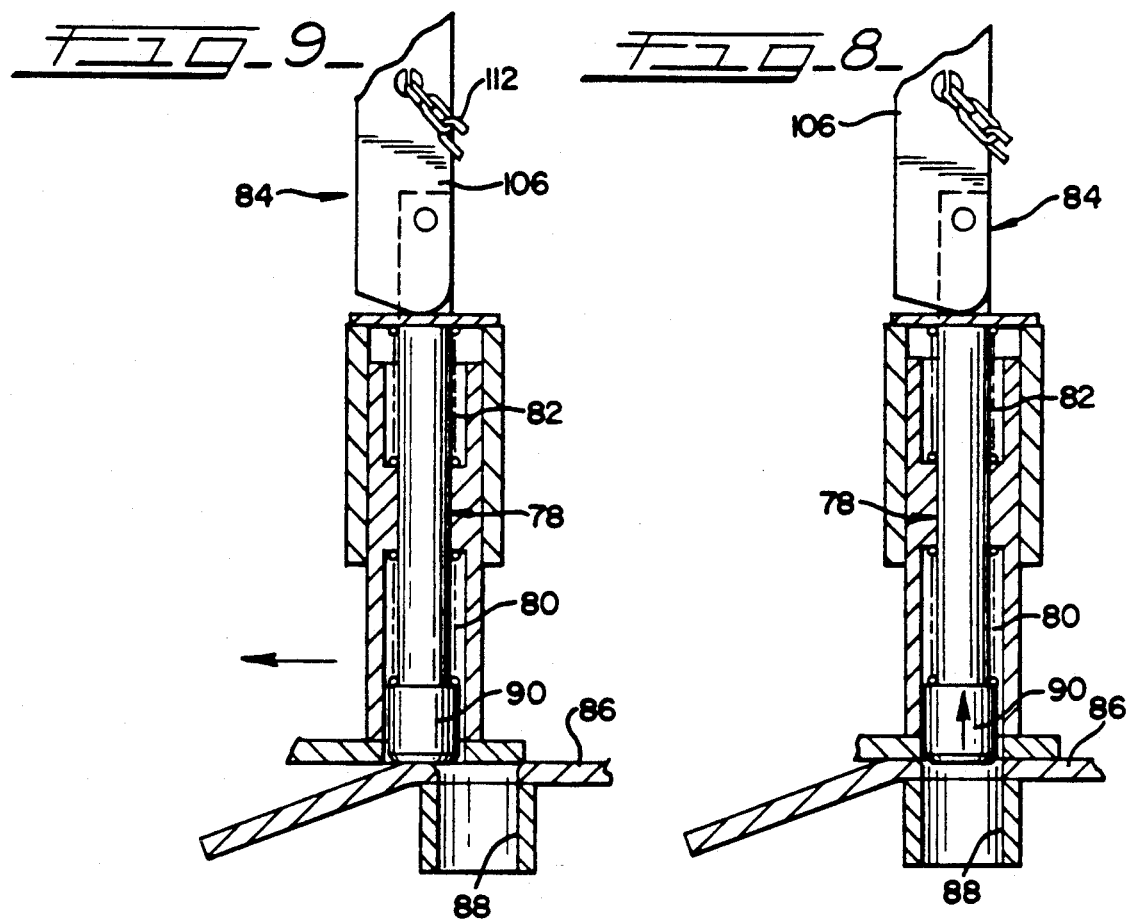
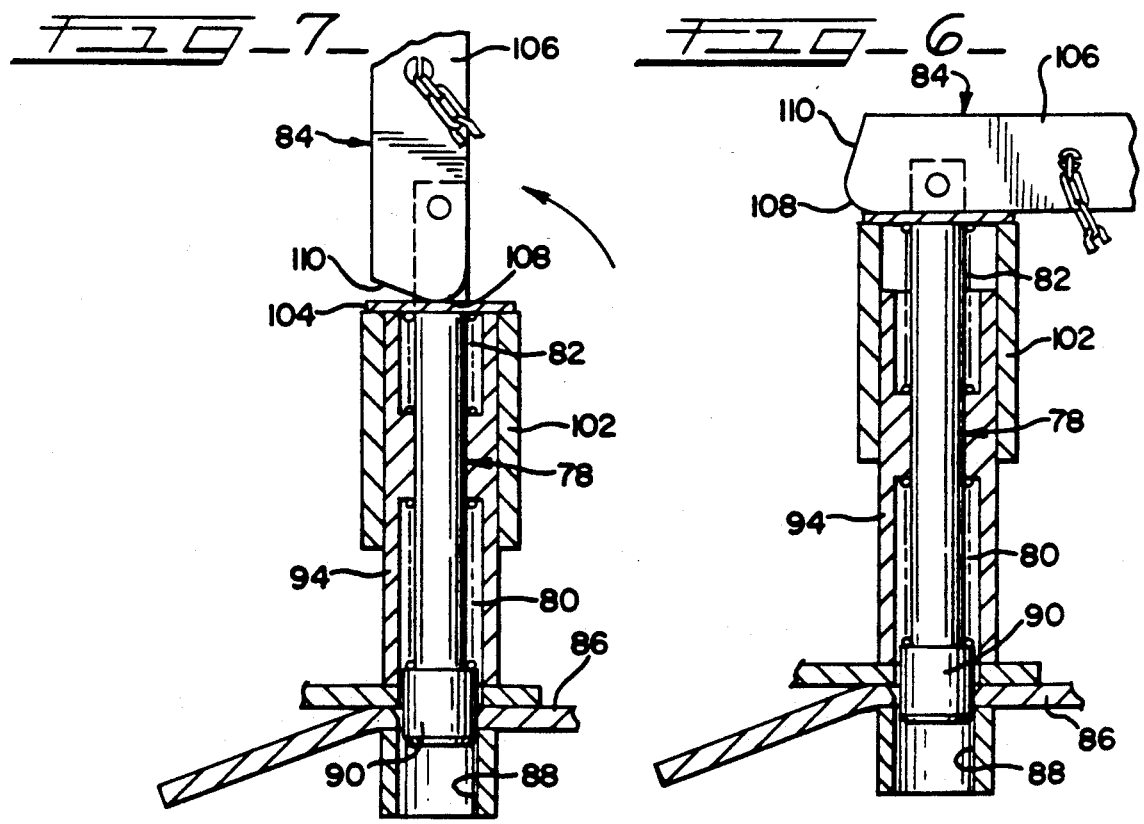

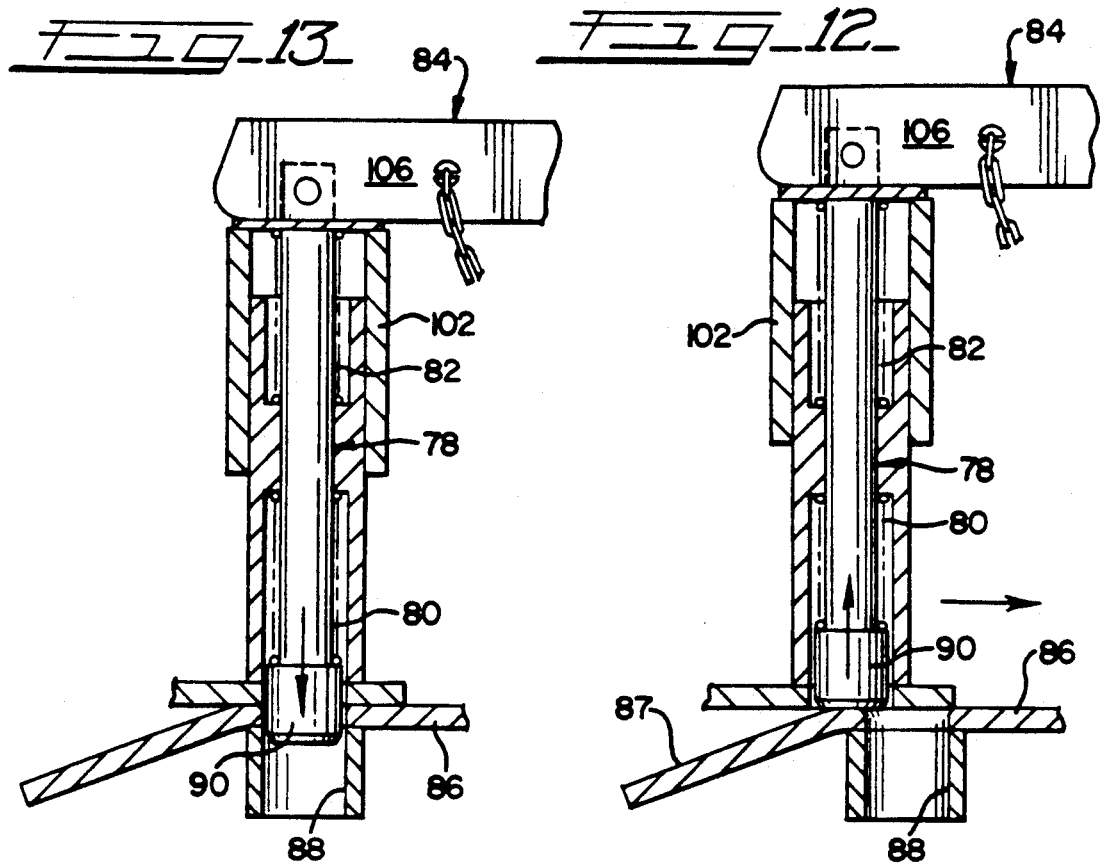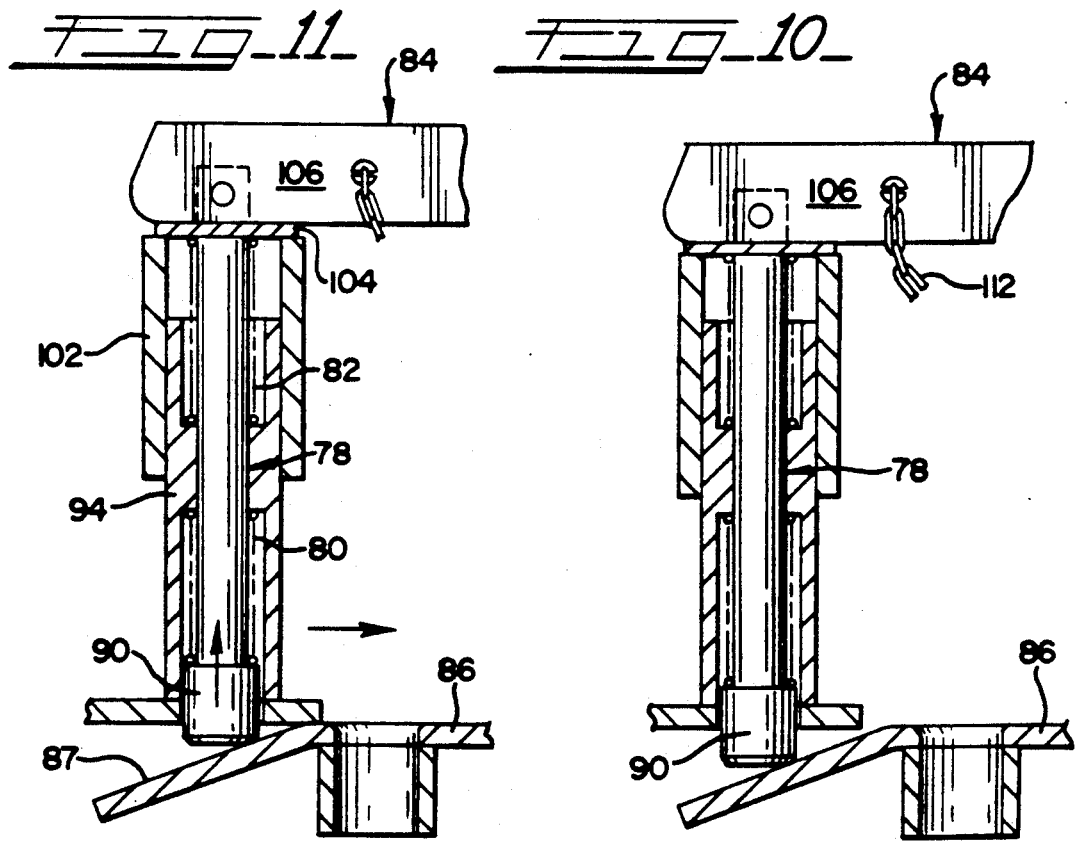

5,077,960

LATCHING MECHANISM FOR A HARVESTING UNIT OF A COTTON HARVESTER

FIELD OF THE INVENTION

The present invention generally relates to cotton harvesters and, more particularly, to a latch mechanism for selectively controlling lateral movement of one or more harvesting units across a front end of a cotton harvester.

BACKGROUND OF THE INVENTION

Conventional self-propelled cotton harvesters utilize individual harvesting units mounted at a forward end of the harvester for harvesting cotton. Cotton harvesters having up to four or more individual harvesting units arranged in side-by-side relationship relative to each other have been designed to increase cotton picker production. Typically, the harvesting units are individually connected to a support structure which extends laterally across a forward end of the cotton harvester. Although considerable design effort has resulted in cotton harvester units of reduced size and weight, the usage and required operation of such units mandate a relatively large size mechanism having considerable weight.

Until recently, the size and weight of the harvesting units made it difficult, inconvenient, and impractical to move the individual harvesting units laterally across the support structure to provide added clearance for inspection and servicing of the harvesting units. The lateral range of adjustment allowed was usually inadequate to provide sufficient space for good access between the units even if one were to adjust the units during servicing. The lack of space and adjustment of the units is particularly critical in narrow row cotton harvesters adapted to harvest cotton planted in rows spaced as narrowly as 30 inches.

Recent advancements, however, allow and promote the lateral movement of one or more of the harvesting units along the support structure to enhance versatility of the harvester and facilitate access between the harvesting units for inspection and service. In those embodiments where four harvesting units are arranged on the support structure, an inner and an outer harvesting unit, constituting a first harvesting pair or set, are usually arranged to one side of the center of the cotton harvester. An inner and outer harvesting unit, constituting a second harvesting pair or set, are usually arranged on the opposite side of the harvester.

During inspection or servicing, the operator may desire to laterally move the harvesting units of each harvesting set independently of each other or conjointly with each other. To gain access between the two inner harvesting units, either harvesting set can be laterally moved along the length of the support structure. To gain access between adjacent harvesting units of a harvesting set, the outer harvesting unit is laterally moved outwardly along the length of the support structure, thus widening the lateral space between adjacent harvesting units.

To complement advancements in the ability to laterally shift the harvesting units, a suitable drive mechanism may be provided for positively positioning and effecting powered movement of the harvesting units along the length of the support structure. The drive mechanism can be automatically operated from a cab region of the harvester.

It is known to use locking pins for securing individual harvesting units in position along the length of the support structure. To adjust for different row widths or to move the harvesting units laterally for inspection and/or maintenance, the pins are retracted from a locked position and the harvesting units are rolled or slid along the support structure to new positions. It is also known to resiliently bias such a pin toward a locked position such that the pin will automatically lock in place after the harvesting unit is laterally moved into the desired position or location.

When the ground surface on which the harvester is located is inclined or sloped, the weight of the harvesting unit has a natural tendency to gravitationally and laterally shift the harvesting unit. This tends to cause the locking pin to jam, subject to the weight of the harvesting unit being applied thereagainst.

Jamming of the locking pin frustrates attempts at lateral displacement of the harvesting units along the length of the support structure. Not only does the pin jamming problem need to be corrected prior to lateral movement of the harvesting unit, but after freeing the pin the operator needs to be attentive that the pin remains free and does not return to its jammed position prior to laterally moving the harvesting unit. As will be appreciated, jamming of the locking pin furthermore detracts from the automated usefulness of the driver for laterally moving the harvesting units along the length of the support structure.

Accordingly, there is both a need and desire for a latching mechanism which allows quick release and lateral movement of the harvesting units in a manner eliminating the attentive requirement of heretofore known locking pins and thereby facilitating automated lateral movement of the harvesting units along the length of the support structure.

SUMMARY OF THE INVENTION

In view of the above, and in accordance with the present invention, there is provided a latching mechanism for a harvesting unit of a cotton harvester. The latching mechanism includes a latching pin which is associated with a harvesting unit for movement therewith and which is resiliently biased in two opposite directions. The latching pin is endwise movable along a generally straight line path of travel between a locked position whereat the pin inhibits lateral movement of the associated harvesting unit and a released position whereat the pin allows for lateral movement of the associated harvesting unit. A handle, which is selectively movable between locked and released positions, is connected to and moves the latching pin between corresponding positions. The resiliency of the latching pin allow movement of the handle between positions while facilitating consequent movement of the latching pin between corresponding positions.

More specifically, the latching mechanism of the present invention finds utility with a cotton harvester which includes a frame supported by a pair of wheeled axles. To promote capacity of the harvester, several harvesting units are individually supported at a forward end of the frame in adjacent or side-by-side relationship relative to each other.

To facilitate access therebetween, the harvesting units are individually supported by and connected to a support structure in a manner permitting independent lateral adjustment along the length of the support structure. In the illustrated embodiment, the support structure to which the harvesting units are connected includes an elongated tool bar assembly which laterally extends across a forward end of the harvester frame. The tool bar assembly is connected to the frame by a lift assembly which allows the tool bar assembly and the harvesting units connected thereto to be vertically displaced relative to the frame of the harvester while maintaining the harvesting units in a substantially constant parallel orientation relative to the ground surface.

In the preferred embodiment, and to enhance visibility of the harvesting units from a cab region of the harvester, the harvesting units are movably supported at their rearmost edges and extend forwardly from their connection to the tool bar assembly. As mentioned above, it is common to support an inner and an outer harvesting unit, constituting one harvesting set, to one side of the centerline of the harvester while supporting an inner and an outer harvesting unit, constituting a second harvesting set, on the opposite side of the harvester. To gain access between the inner two harvesting units, either harvesting set is moved outwardly along the length of the support structure. Moreover, to gain access between the harvesting units of a harvesting set, the harvesting units of that set are movable relative to each other along the length of the support structure.

A driver is provided for selectively affecting powered movement of the harvesting units as a harvesting set or independently of each other. In a preferred form of the invention, the driver is actuated from a cab region of the harvester and includes a double-acting linearly distendable driver which moves and positively positions the harvesting units along the length of the support structure as a function of the actuated state of the driver.

In a preferred form of the invention, the latching mechanism of the present invention is illustrated as being used in combination with a harvesting set. It should be appreciated, however, that the principles of operation of the present invention equally apply to use of the latching mechanism for individually securing a harvesting unit against lateral movement along the length of the support structure.

When used in combination with a harvesting set, the latching pin carried by one harvesting unit of the harvesting set cooperates with a latch member which is associated and moves with an adjacent harvesting unit of the harvesting set. The latch member extends across the path of travel of the latching pin. When the latching pin is in a locked position, an end portion of the pin is coupled with the latch member such that upon lateral movement of either harvesting unit the other harvesting unit conjointly moves therewith. In a released position, the pin permits independent movement of the harvesting units relative to each other to widen and facilitate access therebetween.

In the illustrated embodiment, a first spring is used to bias the latching pin toward the latch member and a locked position. A second spring is used to bias the latching pin away from the latch member and toward a released position. Preferably, when the latching pin is moved into a released position, the first and second springs impart substantially equal forces to the pin.

In a preferred embodiment, an elongated guide is carried by the outer harvesting unit and is provided in combination with the latching pin. The elongated guide allows the latching pin to reciprocally move along a predetermined path of travel and defines a first seat against which one end of the first spring impinges and a second seat against which one end of the second spring impinges.

The handle for selectively moving the pin is connected toward an opposite end portion of the latching pin. To facilitate its operation, the handle is configured with a camming surface against which a cap is resiliently biased. The cap is arranged for movement about and along the latching pin and is urged under the influence of the second spring against the handle.

To promote its automatic operation, the present invention further includes an apparatus for automatically moving the handle from a released position to a locked position to effect consequent movement of the latching pin. In a preferred form of the invention, automatic movement of the handle is effected after a harvesting unit is moved a predetermined lateral distance relative to an adjacent harvesting unit to which it is connected.

The latching mechanism of the present invention allows the handle to move between alternate positions and alleviates concern over the jamming problem of the latching pin. Having once moved the handle into a desired position, the influence of the two springs acting against the latching pin will move the pin conjointly with the handle or will consequently move the pin into a position corresponding to that of the handle after the force causing the jamming problem has been eliminated. Assuring that the latching pin will move into the desired position promotes movement of the harvesting units and furthermore facilitates automated movement of the harvesting units under the influence of a driver from a cab region of the harvester.

Numerous other features and advantages of the present invention will become readily apparent from the following detailed description, appended drawings, and accompanying claims.

BRIEF DESCRIPTION OF THE DRAWINGS

FIG. 1 is a partial plan view of a cotton harvester illustrating a harvesting unit configuration for harvesting multiple narrow and adjacent rows of cotton;

FIG. 2 is a schematic plan view showing the general configuration of a single harvesting unit;

FIG. 3 is a partial side elevational view of the cotton harvester illustrated in FIG. 1;

FIG. 4 is an enlarged fragmentary side elevational view of a mounting system for connecting a harvesting unit to the cotton harvester;

FIG. 5 is an enlarged partially sectional view of a latching mechanism as used in a preferred form of the invention;

FIGS. 6 through 9 schematically illustrate an unlatching sequence for a preferred form of latching mechanism illustrated in lateral cross-section; and FIGS. 11 through 13 schematically illustrate a latching sequence for a preferred form of the latching mechanism illustrated in lateral cross-section.

DETAILED DESCRIPTION OF THE PRESENT INVENTION

While the present invention is susceptible of embodiments in various forms, there is shown in the drawings a presently preferred embodiment hereinafter described with the understanding that the present disclosure is to be considered as an exemplification of the invention and is not intended to limit the invention to the specific embodiment illustrated.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame 12 mounted on a pair of laterally spaced ground engaging front wheels 14. A pair of steerable rear wheels (not shown) provide the harvester with proper direction.

Positioned forwardly on the frame 12 are a plurality of individual cotton picker harvesting units 20, 22, 24, 26 and 28. As illustrated, the harvesting units are arranged in a side-by-side relationship for harvesting adjacent generally parallel rows of cotton. It should be appreciated, however, that this invention equally applies to a lesser number of harvesting units than that illustrated.

In a preferred form of the invention, each of the harvesting units is substantially similar in structure. Accordingly, only a description of harvesting unit 20 will be provided with the understanding that the other harvesting units are similarly structured.

Turning to FIG. 2, each harvesting unit includes a housing 30 defining a fore-and-aft crop receiving opening or plant passage 32. Each harvesting unit is further provided with stalk lifters 34 on either side of opening 32 to guide the row of plants to the opening or passage 32.

As illustrated in FIG. 2, each harvesting unit further includes front and rear spindle rotor assemblies 36 and 38 which, in the preferred embodiment, are transversely separated by the fore-and-aft plant passage 32. Adjacent the spindle rotor assemblies 36 and 38 are conventional upright doffer assemblies 40 and 42, respectively, which remove cotton from the picking spindles on the spindle rotor assemblies 36 and 38.

The spindle rotor assemblies 36 and 38 and the doffer assemblies 40 and 42 are driven by a conventional drive assembly 44. As illustrated in FIG. 2, such a drive assembly 44 includes a beveled gear transmission mounted in a gear housing 45 preferably arranged at an upper end of each housing 30. Telescopic drive shafts 46 transmit torque and power from input drive shafts 48 (FIG. 1) to adjacent harvesting units and permit lateral disbursement of the harvesting units with respect to each other without loss of power.

A support structure, indicated generally by reference numeral 50 in FIG. 1, is provided for individually connecting each of the harvesting units to the frame 12 for vertical and lateral movement relative thereto. The support structure 50 is preferably of the type disclosed in co-assigned and co-pending U.S. Pat. application Ser. No. 07/436,304 filed Nov. 13, 1989. As disclosed in detail therein, the support structure 50 includes a lift assembly 52, a laterally elongated tool bar assembly 54 supported at a forward end of the lift assembly 52, and individual slide support structure 56 associated with and connecting each harvesting unit to the tool bar structure 54.

As illustrated in FIG. 1, outer and inner harvesting units 20 and 22, respectively, are adjacently mounted on the tool bar assembly 54 and define a first harvesting set. Each of the harvesting units 20 and 22 is laterally and slidably movable to adjust for various row widths and to open up space between adjacent harvesting units to facilitate servicing thereof. Inner and outer harvesting units 26 and 28, respectively, are adjacently mounted on the tool bar assembly 54 and define a second harvesting set. Each harvesting unit 26 and 28 is laterally and slidably movable relative to an adjacent harvesting unit to adjust for row widths and to open up space between adjacent harvesting units to facilitate servicing thereof. As illustrated, harvesting unit 24 is fixedly secured between inner harvesting units 22 and 26.

Lift assembly 52 operates as a four-bar parallelogram-type linkage. Lift assembly 52 is pivotally connected to and extends forwardly from the frame 12 for securing the harvesting units to the frame and for permitting vertical displacement of the harvesting units between raised and lowered positions. Each slide support structure 56 connects an associated harvesting unit to the tool bar assembly 54 in a manner allowing independent slidable and lateral movements between the ends of the tool bar assembly while concurrently inhibiting pivotal movement of the harvesting unit about the elongated length of the tool bar assembly. As illustrated in FIGS. 3 and 4, each slide support structure 56 is advantageously provided at a rear end of the harvesting unit to allow the harvesting unit to hang off of and forwardly extend from the tool bar assembly 54 in a manner providing increased access between the units and enhanced operator visibility to the forward end of the harvesting unit from a cab region on the cotton harvester.

Preferably, each slide support structure 56 includes a generally U-shaped bracket assembly with a pair of upstanding lever arms 58 and 60 (FIG. 1) which are joined at a lower end by a channel-shaped bracket 62 (FIG. 4). As illustrated in FIGS. 1, 3 and 4, a tension link 64 extends from an upper end of each slide support structure 56 and is connected toward a forward end of the harvesting unit.

As described in specific detail in the above-identified patent application, each slide support structure 56 is adapted to straddle and slide along support surfaces defined by the tool bar assembly 54. The straddling or embracing relationship between each slide support structure 56 and the tool bar assembly 54 permits the substantial weight of the harvesting unit connected thereto to be spread over a substantial surface area to promote lateral sliding movement of the harvesting units along the tool bar assembly while inhibiting rotational movement thereof about the longitudinal axis of the tool bar assembly 54.

To facilitate lateral movement of the harvesting units along the tool bar assembly 54, relatively low friction and durable surfaces are provided between confronting surfaces on each slide support structure 56 and the support surfaces on the tool bar assembly 54. Alternatively, a series of rollers may be provided in combination with each slide support structure for facilitating lateral movement of the harvesting unit along the length of the tool bar structure.

A selectively operated drive mechanism 66 is provided to facilitate precise and positive lateral positioning of each movable harvesting unit along the length of the tool bar assembly 54. In a preferred form, and as illustrated in FIG. 1, drive mechanism 66 includes a pair of linearly distendable drivers 68 and 70 which extend in opposite directions relative to each other and generally parallel to the tool bar structure 54. It should be appreciated, however, that other types of drivers could likewise be used for effecting powered movement of the harvesting units along the length of the tool bar.

In a most preferred form, each driver 68 and 70 is a double-acting hydraulic cylinder. The cylinder end of each driver is pivotally connected to the tool bar assembly 54. The rod end of each driver extends toward and is connected to the outer harvesting unit of each harvesting set at opposite ends of the tool bar assembly 54. In operation, each driver of the drive mechanism 66 effects powered movement of the associated harvesting units either as a set or independently of each other.

According to the present invention, a pair of latching mechanisms 74 and 76 are provided for selectively joining outer harvesting unit 20 to inner harvesting unit 22, and outer harvesting unit 28 to inner harvesting unit 26, respectively. As will be appreciated, each harvesting unit could alternatively be provided with its own latching mechanism. Since latching mechanisms 74 and 76 are substantially similar to each other, only latching mechanism 74 will be described in detail with the understanding that latching mechanism 76 is substantially similar in construction.

Turning to FIG. 5, each latching mechanism includes an endwise movable latching pin 78 which is biased in two opposite directions and is associated with a harvesting unit for movement therewith as the harvesting unit moves laterally along the length of the tool bar structure. The latching pin 78 is endwise movable along a generally straight line path of travel between a locked position whereat the pin inhibits lateral movement of the associated harvesting unit, and a released position whereat the pin allows for lateral movement of the associated harvesting unit. A first spring 80 resiliently urges the latching pin 78 toward its locked position (FIG. 5). Preferably, a predetermined preload force is applied to pin 78 by spring 80. A second spring 82 resiliently urges the latching pin 78 toward its released position (FIG. 8). Preferably, a predetermined preload force is likewise applied to pin 78 by spring 82. A handle mechanism 84 is movable between a locked position (FIG. 5) and a released position (FIG. 7) and is provided for selectively moving the latching pin 78 between corresponding locked and released positions.

In the illustrated embodiment, each latching mechanism selectively connects an outer harvesting unit to an inner harvesting unit. When the latching mechanism is used to releasably connect two harvesting units, the latching pin 78 is preferably associated with and carried by the outer harvesting unit. In the illustrated embodiment, each latching mechanism further includes a generally horizontal latch member 86 which extends toward and laterally across the path of travel of latching pin 78. Latch member 86 is adapted to move into a coupled relationship with the latching pin 78 when pin 78 is arranged in a locked position. As illustrated, latch member 86 is carried by lever arm 58 of a sliding support structure on an adjacent inner harvesting unit and defines an aperture 88 for releasably accommodating a portion of the latching pin 78.

For reasons to be discussed hereinafter, a distal end of latch member 86 is preferably provided with a camming or ramp surface 87. From the distal end of latch member 86, camming surface 87 extends upwardly and terminates at a location substantially coplanar with an upper surface of latch member 86.

In the illustrated embodiment, latching pin 78 includes an enlarged head portion 90 against which one end of spring 80 impinges. The head portion 90 of pin 78 is movable into and out of the aperture 88 defined by latch member 86 and has an elongated stem portion 92 extending therefrom. The latching pin 78 is reciprocally guided by an elongated guide 94 which is preferably secured to and carried by lever arm 60 of a sliding support structure on the outer harvesting unit.

Guide 94 defines a first seat 96 against which an opposite end of spring 80 impinges. Guide 94 further defines a second seat 98 against which one end of spring 82 impinges. Intermediate its ends, guide 94 defines an annular collar 100 which reciprocally guides pin 78 along its generally straight path of travel.

A cap 102 is telescopically arranged for movement about and along the guide 94 beneath the handle mechanism 84. The cap 102 includes an apertured cover 104 through which the elongated stem portion 92 of pin 78 extends and which is urged against the handle mechanism 84 under the influence of spring 82.

The handle mechanism 84 includes an elongated bifurcated handle 106 which is movable between locked and released positions. Handle 106 is articulately connected intermediate its ends toward an end of stem portion 92 of pin 78. To facilitate operation, handle 106 is provided with a camming surface 108 and a stopping surface 110.

Preferably, each latching mechanism of the present invention further includes an automatically operated mechanism for returning the handle mechanism 84 to a locked position when the outer harvesting unit is moved a predetermined distance along the tool bar structure. In the illustrated embodiment, such automatic mechanism includes a chain or rope-like device 112 which automatically returns the handle 106 to its locked position after the outer harvesting unit is moved a predetermined distance (measured by the length of chain 112) relative to an adjacent inner harvesting unit. As will be appreciated, other suitable devices such as bars which extend across the path of a raised handle could likewise be used to automatically return the handle 106 to its locked position without detracting from the spirit and scope of the present invention.

To facilitate inspection and servicing of the harvesting units, the lateral spacing therebetween is increased by laterally moving the harvesting units along the tool bar structure 54. The relative low friction and durable surfaces provided between each slide support structure 56 and the tool bar structure 54 reduces the frictional sliding contact therebetween. Alternatively, rollers can be used in combination with each slide support structure for moving the harvesting units along the length of the tool bar structure.

To further facilitate precise and positive lateral sliding movement of the harvesting units along the tool bar structure 54, the operator control drive mechanism 66 may be operated. Preferably, operation of the drive mechanism 66 is controlled from a cab region of the harvester. To promote automatic operation of the drivers 68 and 70 comprising the drive mechanism, the handle mechanism 84 of each latching mechanism can be moved into a desired position and the latching pin 78 will consequently be moved into a corresponding position.

As mentioned above, under some circumstances, the latching pin 78 of a latching mechanism may have a tendency to become jammed or otherwise inhibited from endwise movement. The present invention alleviates concerns over jamming problems by allowing movement of the handle mechanism 84 between positions while facilitating consequent movement of the latching pin 78 between corresponding positions. The term "consequent movement" is meant to include movement conjointly with movement of the handle mechanism 84 between alternate positions or followed shortly thereafter when the frictional forces inhibiting the latching pin 78 from moving between positions have been sufficiently reduced or eliminated in a manner allowing endwise movement of the pin.

In a most preferred form of the invention and as illustrated in FIG. 6, when latching pin 78 is in a locked position, head portion 90 is releasably accommodated within aperture 88 of latch member 86 thereby maintaining a coupled relationship between adjacent harvesting units of a harvesting set. As schematically illustrated in FIG. 6, the head portion 90 of latching pin 78 may be temporarily binding or pressed into frictional contact with the lower latch member 86 in a manner inhibiting movement thereof. Such frictional contact may result from gravitational shifting of the harvesting units or as a result of the associated driver applying a linear force against the harvesting unit in a manner inhibiting pin movement.

Notwithstanding the frictional force which may temporarily inhibit endwise movement of latching pin 78, the handle 106 of handle mechanism 84 may, nevertheless, be moved from a locked position (FIG. 6) to a released position (FIG. 7). Movement of the handle 106 may be facilitated by camming surface 108 and is permitted as a result of linear displacement of cap 102 against the action of spring 82. Movement of the handle 106 is limited by stopping surface 110 abutting with the upper surface of the apertured cover 104. As will be appreciated, linear movement of the cap 102 compresses the spring 82 and increases the spring force acting against cap 102. The spring force of spring 80, however, remains substantially unchanged because the pin 90 is not yet moved relative to guide 94.

When the harvesting units of a harvesting set are laterally moved relative to each other, the binding force on the latching pin 78 will be reduced. When the binding force holding pin 78 within the latch member 86 is sufficiently reduced, spring 82 consequently moves the latching pin 78 from its locked position (FIG. 7) to a released position (FIG. 8).

In its released position, the spring force of spring 80 generally equals the spring force of spring 82 thereby centering the pin 78 as a result of the forces acting thereon. Notably, when the forces on the springs 80 and 82 are equal and the pin 78 is generally centered as a result thereof, the lowermost surface of the head portion 90 is equal to or above the latch member 86 and clear of any binding or coupling relationship thereto.

As illustrated in FIG. 9, when the head portion 90 of the latching pin 78 is clear of latch member 86, the harvesting unit associated with pin 78 is free to laterally move away from the adjacent harvesting unit. Notably, after the handle mechanism 84 is moved to the desired location, operation and movement of the pin 78 is affected automatically and does not involve operator intervention or oversight.

To facilitate automatic operation of the latching mechanism, the handle 106 is automatically returned to a locked position after the harvesting unit is moved a predetermined distance along the tool bar structure. In the preferred embodiment, chain 112 operates to return the handle 106.

In a most preferred form, chain 112, attached to the handle 106 and to the adjacent harvesting unit, reaches its stretched length prior to the outer harvesting unit reaching its full service distance. Accordingly, the chain 112 automatically returns the handle 106 to a locked position after the outer harvesting unit is moved a predetermined lateral distance relative to the adjacent inner harvesting unit.

Having moved the outer harvesting unit laterally with respect to an adjacent inner harvesting unit, the operator is free to gain access therebetween. Thereafter, it may be desirable to provide access between an inner harvesting unit and the stationary harvesting unit 24. To facilitate movement of the inner harvesting unit relative to the harvesting unit 24, the appropriate driver mechanism is operated in a direction drawing the outer harvesting unit toward the inner harvesting unit.

As illustrated in FIG. 10, prior to imparting return movement to the outer harvesting unit, the handle 106 of mechanism 84 is returned to its locked position. Preferably, the handle 106 of mechanism 84 will have been automatically returned to its locked position under the influence of chain 112 after the outer harvesting unit was laterally moved a predetermined distance relative to an adjacent unit as discussed above. In its locked position, the head portion 90 of the latching pin 78 depends beneath the latch member 86.

During its movement toward the inner harvesting unit, the lower surface on the pin 78 engages the camming surface 87 provided on latch member 86. As illustrated in FIG. 11, engagement of the pin 78 against ramp or camming surface 87 causes pin 78 to move endwise within the guide 94. During its movement within the guide, the lower spring 80 is compressed and the upper spring 82 goes toward an unloaded condition.

As illustrated in FIG. 12, at the top of ramp or camming surface 87, the lowermost end of pin 78 is coplanar with the uppermost surface of latch member 86. In such a position, the spring 80 is fully compressed and exerts an increased downward force on the head portion 90 of the latching pin 78.

As illustrated in FIG. 13, continued lateral movement of the outer harvesting unit will ultimately result in the head portion 90 of latching pin 78 becoming aligned with the aperture 88 in latch member 86. Upon alignment, the head portion 90 snaps into the aperture 88 under the influence of the spring 80. In this position, both springs 80 and 82 are at their initial preload condition and the handle 106 of handle mechanism 84 is resiliently urged against the cap 102.

With the harvesting units connected together by the latching mechanism, operation of the drive mechanism will result in powered lateral movement of the harvesting units 20 and 22 away from the center harvesting unit 24 and along the length of the tool bar structure. Lateral movement of the harvesting units 20 and 22 will facilitate inspection and servicing between harvesting units 22 and 24.

Because the latching pin 78 is automatically moved into the proper position either conjointly with or consequent to movement of the handle mechanism 84, the operator is allowed to return to the cab section after the handle mechanism 84 is suitably positioned without concern over the position of the latching pin. As will be appreciated, automated movement of the harvesting units or manual movement of the harvesting units without concern for the position of the latching pin 78 will readily facilitate inspection and servicing of the harvesting units.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

What is claimed is:

1. A latching mechanism for a harvesting unit of a cotton harvester, said cotton harvester including a frame, a laterally elongated support structure connected to and extending across a forward end of said frame for supporting said harvesting unit, means for individually connecting said harvesting unit to said support structure for lateral movement therealong, said latching mechanism comprising;

an endwise movable latching pin carried by said harvesting unit for movement therewith as the harvesting unit is laterally moved along said support structure, with said latching pin being movable between a locked position whereat the pin inhibits lateral movement of said harvesting unit along said support structure and a released position whereat the pin allows lateral movement of said harvesting unit along said support structure;

means for resiliently urging said latching pin toward its locked position;

means for resiliently urging said latching pin toward its released position;

handle means selectively movable between locked and released positions for moving said latching pin between corresponding locked and released positions, and wherein at least one of said resiliently urging means allows movement of said handle means between its locked and released positions while facilitating consequent movement of said latching pin between its locked and released positions; and means for automatically returning said handle means from said released position to said locked position upon said harvesting unit being moved a predetermined distance along said support structure.

2. A latching mechanism for selectively locking and unlocking first and second side-by-side harvesting units of a cotton harvester relative to each other, each of said harvesting units being mounted for lateral movement along a tool bar assembly, said tool bar assembly extending across a forward end of a frame of said cotton harvester, said latching mechanism comprising;

a spring biased latching pin carried by said first harvesting unit for movement therewith, said latching pin being mounted for endwise movement along a generally straight line path of travel;

a latch member carried by said second harvesting unit for movement therewith, said latch member extending across the path of travel of said latching pin, wherein said latching pin is adapted to move into a locked position in which said latching pin engages with said latch member carried by said second harvesting unit such that said harvesting units are not free to laterally move relative to each other and upon lateral movement of said first harvesting unit said second harvesting unit moves conjointly therewith, and into an unlocked position in which said latching pin is released from engagement with said latch member on the second harvesting unit and the harvesting units are free to laterally move relative to each other to allow space between said harvesting units to be widened thereby facilitating access between the harvesting units;

first resilient means for urging said latching pin toward said latch member under a predetermined force;

second resilient means for urging said latching pin away from said latch member under a predetermined force; and handle means connected to said latching pin and movable between locked and unlocked positions for selectively moving said latching pin between corresponding locked and released positions relative to said latch member, and wherein said first resilient means yields to allow movement of said handle means between positions and facilitates consequent movement of said latching pin relative to said latch member in a manner unlocking said first and second harvesting units from each other.

3. The latching mechanism according to claim 2 wherein said latching mechanism further includes cap means arranged about said latching pin and urged under the influence of said second resilient means against said handle means.

4. The latching mechanism according to claim 3 wherein said handle means includes a camming surface against which said cap means is biased and which facilitates movement of said handle means between its positions.

5. The latching mechanism according to claim 2 wherein said latch member defines an aperture adapted to releasably accommodate one end of said latching pin when said first and second harvesting units are locked to each other.

6. The latching mechanism according to claim 2 wherein said first and second resilient means impart substantially equal forces to said pin when said handle means is in a first position and impart unequal forces to said pin when said handle means is in a second position.

7. A latching mechanism for selectively coupling and uncoupling first and second side-by-side harvesting units of a cotton harvester, each of said harvesting units being mounted for lateral movement along a tool bar assembly, said tool bar assembly extending across a forward end of a frame of said cotton harvester, said latching mechanism comprising:

a latching pin carried by said first harvesting unit for movement therewith, said latching pin being mounted for endwise movement along a generally straight line path of travel;

a latch member carried by said second harvesting unit for movement therewith, said latch member extending across the path of travel of said latching pin, wherein one end of said latching pin is adapted to move into a coupled relationship with said latch member such that, upon lateral movement of at least said first harvesting unit, said second harvesting unit moves conjointly therewith, and into an uncoupled relation with said latch member to allow space between said harvesting units to be widened thereby facilitating access between the harvesting units;

first resilient means for urging said latching pin away from said latch member under a predetermined force;

second resilient means for urging said latching pin away from said latch member under a predetermined force;

an elongated guide means in which said latching pin reciprocally moves, said guide means defining a first seat against which one end of said first resilient means impinges and a second seat against which one end of said second resilient means impinges; and handle means connected toward an opposite end of said latching pin and movable between two positions for selectively moving said latching pin between coupled and uncoupled relationships with said latch member, and wherein said first resilient means yields to allow movement of said handle means between said two positions and facilitates consequent movement of said latching pin relative to said latch member in a manner uncoupling said first and second harvesting units from each other.

8. A latching mechanism for selectively coupling and uncoupling first and second side-by-side harvesting units of a cotton harvester, each of said harvesting units being mounted for lateral movement along a tool bar assembly, said tool bar assembly extending across a forward end of a frame of said cotton harvester, said latching mechanism comprising;

a latching pin carried by said first harvesting unit for movement therewith, said latching pin being mounted for endwise movement along a generally straight line path of travel;

a latch member carried by said second harvesting unit for movement therewith, said latch member extending across the path of said latching pin, wherein one end of said latching pin is adapted to move into a coupled relationship with said latch member such that, upon lateral movement of at least said first harvesting unit, said second harvesting unit moves conjointly therewith, and into an uncoupled relation with said latch member to allow space between said harvesting units to be widened thereby facilitating access between the harvesting units;

first resilient means for urging said latching pin toward said latch member under a predetermined force;

second resilient means for urging said latching pin away from said latch member under a predetermined force;

handle means connected toward an opposite end of said latching pin and movable between two positions for selectively moving said latching pin between coupled and uncoupled relationships with said latch member, and wherein said first resilient means yields to allow movement of said handle means between said two positions and facilitates consequent movement of said latching pin relative to said latch member in a manner uncoupling said first and second harvesting units from each other; and means for automatically moving said handle means after said harvesting units are moved a predetermined lateral distance relative to each other.

9. The latching mechanism according to claim 8 wherein said latch member is configured to move said latching pin against the force of said first resilient means thereby causing said latching pin to automatically recoupled the harvesting units to each other upon return movement of said first harvesting unit to a harvesting position.

* * * * *